US008385989B2

(12) United States Patent
Lundell et al.

(10) Patent No.: US 8,385,989 B2
(45) Date of Patent: *Feb. 26, 2013

(54) FASCIA ASSEMBLY FOR A PORTABLE ELECTRONIC DEVICE

(75) Inventors: Louis J. Lundell, Buffalo Grove, IL (US); Dong Rim Lee, Gunpo (KR); Andy K. Baw, Wheeling, IL (US); Adam K. Cybart, McHenery, IL (US); David G. Fliszar, Gurnee, IL (US); Daniel P. Groebe, Lake Zurich, IL (US); Nicholas A. Jinkinson, Reading (GB); Rick Latella, Woodstock, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1587 days.

This patent is subject to a terminal disclaimer.

(21) Appl. No.: 11/679,218

(22) Filed: Feb. 27, 2007

(65) Prior Publication Data

US 2008/0004088 A1      Jan. 3, 2008

Related U.S. Application Data

(63) Continuation-in-part of application No. 11/427,444, filed on Jun. 29, 2006.

(51) Int. Cl.
*H04M 1/02* (2006.01)
(52) U.S. Cl. ..................... 455/575.1; 345/169
(58) Field of Classification Search .......... 455/550, 455/566, 575.1; 345/169, 173, 168; 349/97; 341/23
See application file for complete search history.

(56) References Cited

U.S. PATENT DOCUMENTS

| | | | |
|---|---|---|---|
| 5,491,313 A | 2/1996 | Bartley et al. | |
| 6,504,928 B1 | 1/2003 | Toyooka | |
| 6,752,946 B2 | 6/2004 | Toyooka | |
| 6,824,916 B2 | 11/2004 | Vine | |
| 6,824,919 B2 | 11/2004 | Law et al. | |
| 6,839,430 B2 | 1/2005 | Kwak | |
| 7,236,588 B2 | 6/2007 | Gartrell | |
| 2002/0094838 A1* | 7/2002 | Wang | 455/550 |
| 2003/0036362 A1 | 2/2003 | Buesseler et al. | |
| 2004/0206608 A1 | 10/2004 | Chao et al. | |
| 2004/0253998 A1 | 12/2004 | Dunleavy et al. | |
| 2005/0130721 A1 | 6/2005 | Gartrell | |
| 2007/0275751 A1 | 11/2007 | Yu et al. | |

OTHER PUBLICATIONS

Tran, Tuan A., "Non-Final Office Action", U.S. Appl. No. 11/427,444, filed Jun. 29, 2006, First Inventor Andy K. Baw, mailed Nov. 30, 2009.
Tran, Tuan A., "Non-Final Office Action", U.S. Appl. No. 11/427,444, filed Jun. 29, 2006, And K. Baw—First Inventor, Mailed Jul. 21, 2010.
Tran, Tuan A., "Final Office Action", U.S. Appl. No. 11/427,444, filed Jun. 29, 2006, mailed Dec. 22, 2010.
Tran, Tuan A., "Final Office Action", U.S. Appl. No. 11/427,444, filed Jun. 29, 2006, mailed Oct. 5, 2011.
Patent Cooperation Treaty, "PCT Search Report and Written Opinion of the International Searching Authority" for International Application No. PCT/US2007/64891, Feb. 8, 2008, 7 pages.

* cited by examiner

*Primary Examiner* — Phuoc Doan

(57) ABSTRACT

A fascia member (200) for a wireless telecommunication device (700) or other electronic device includes a thin, flexible membrane (201) having a transparent, reinforcing member (212) coupled thereto. The thin, flexible membrane (201) includes a transparency region (203) and a deflectable key region (204). The thin, flexible membrane (201) may thus serve as a major front face for the wireless telecommunication device (700) with no break lines between display and keypad. Printing on one side of the thin, flexible membrane (201) provides alphanumeric indicia (207) and graphical designs for the wireless telecommunication device (700). Printing may also be applied to the transparent, reinforcing member (212).

18 Claims, 7 Drawing Sheets

FASCIA ASSEMBLY FOR A PORTABLE ELECTRONIC DEVICE

CROSS REFERENCE TO PRIOR APPLICATIONS

This application is a continuation-in-part of U.S. application Ser. No. 11/427,444, filed Jun. 29, 2006, which is incorporated by reference for all purposes.

BACKGROUND

1. Technical Field

This invention relates generally to a fascia for a portable electronic device, and more specifically to a fascia assembly having a thin, flexible membrane that serves both as a depressible keypad and as a display.

2. Background Art

Portable electronic devices, such as mobile telephones, portable music players, and portable gaming devices, are becoming more and more commonplace. While once a rare luxury, it is now not uncommon to see a person with two or three electronic devices operating simultaneously. For example, a businessperson commuting to work may have a mobile telephone for receiving calls, a portable music player for listening to music, and a wireless messaging device for sending e-mail and browsing the Internet. Advances in engineering and design have made these devices increasingly affordable.

In addition to reducing prices, advances in technology have also reduced the size of these devices. While a mobile telephone in the early 1980s came in a bag and was about the size of a shoe, today's mobile telephones easily slip into a shirt pocket. The devices are becoming more stylish as well. By way of example, the RAZR mobile telephone, manufactured by Motorola, Inc., has won critical acclaim for its sleek, ultra thin design. Consumers sometimes give as much weight to the aesthetic appearance of a device when making a purchase as they do to the device's feature set. As such, the trend for designers is to create smaller devices without compromising aesthetic appeal.

There are problems, however, in attempting to design new, smaller, more fashionable devices. One problem involves tooling limitations in the manufacture of exterior housing components of these devices. The most common way to manufacture durable housing components for rechargeable battery packs is by way of injection molding. In the injection molding process, molten plastic is injected into the cavity of a metal mold. The plastic flows throughout the cavity, thereby filling it. When the plastic cools, the mold is opened and the plastic part is removed.

The problem with this process is that there is a fundamental limit to the minimum thickness per unit area of the walls of any part. This is due to the flow of the molten plastic. If the cavity in the mold includes passages that are too thin, the plastic will not flow properly through these thin regions. Improper plastic flow leads to parts with walls that break easily or have holes in them. The net result is a battery housing with walls that fall apart too easily.

A second problem involves the user interface. Injection molded parts are generally manufactured from rigid materials such as polycarbonate and ABS resins. To incorporate a user interface, such as a keypad for example, the designer must add holes for keys and buttons. By adding these holes, the plastic remaining between the holes must be increased in thickness to provide the overall rigidity. This increased bulk can compromise the aesthetic appearance.

There is thus a need for an improved electronic device housing that offers a thinner, yet still reliable, housing component.

Figure 1:
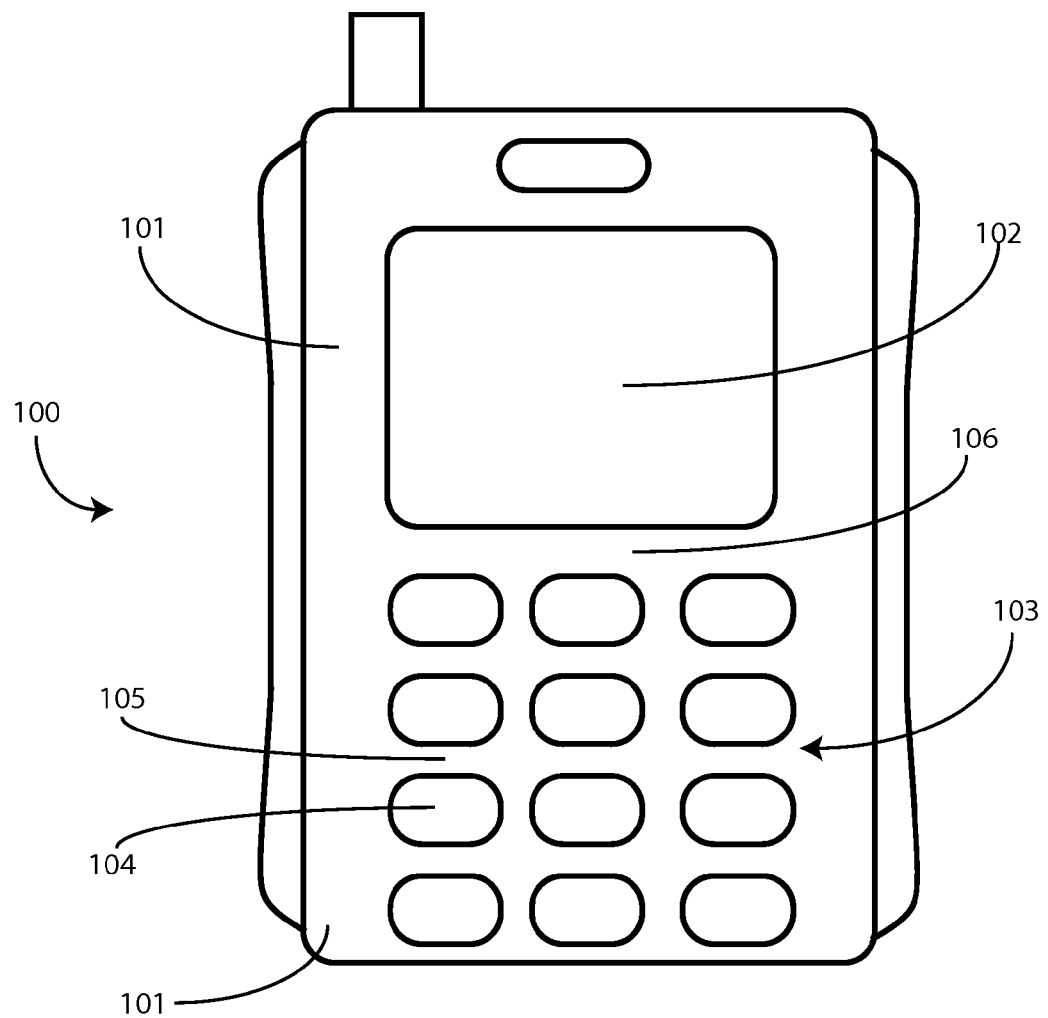
FIG. 1 illustrates a prior art electronic device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." In this document, relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in a figure other than figure A.

Turning first to FIG. 1, illustrated therein is a prior art electronic device 100 having a prior art housing 101. The prior art housing 101, which is plastic made by way of injection molding, is a multi-part assembly. The prior art housing 101 has a display cover 102 attached thereto. The display cover 102, which is a separate piece of translucent plastic, is generally glued or snapped to the prior art housing 101. To accommodate snaps, the prior art housing 101 must generally be two to three millimeters thick at a minimum.

The prior art housing 101 also includes several keys 104. The keys 104 protrude through holes in the prior art housing 101. The keys 104 may be components manufactured from injection molded plastic as well, which are mounted on spring-loaded switches within the device 100. To maintain sufficient rigidity, sections of plastic 105 between the keys 104 must be several millimeters in width and two to three millimeters thick. Additionally, the mechanical separation 106 between the display cover 102 and the keys 104, which generally comprises a thick plastic bar, must be many millimeters wide. This mechanical separation 106 can be an unaesthetic feature on the electronic device.

The present invention provides both a thinner fascia and a fascia free from aesthetic limitations such as plastic separation bars, each of which is due to injection molding process used to manufacture the prior art housing 101. In accordance with one embodiment of the present invention, a thin, flexible membrane is used as the front face for an electronic device. A reinforcing member, which is coated glass in one embodiment, is affixed to the thin, flexible membrane to provide rigidity across a transparency region through which the display may be seen. The fascia may either be coupled directly to the front of the device, or may alternatively be coupled to a housing member or skeletal support carrier, which is in turn coupled to the device.

A single, unitary piece of film, which can be extruded or otherwise manufactured at a thickness that is thinner than that found in plastic parts manufactured by injection molding, serves as both a display and keypad in one exemplary embodiment. The single piece of film runs continuously from display to keypad, thereby eliminating any plastic beams or other protruding mechanical separations running across the device. The result is a clean, sleek, smooth, thin, and elegant device housing.

Figure 2:
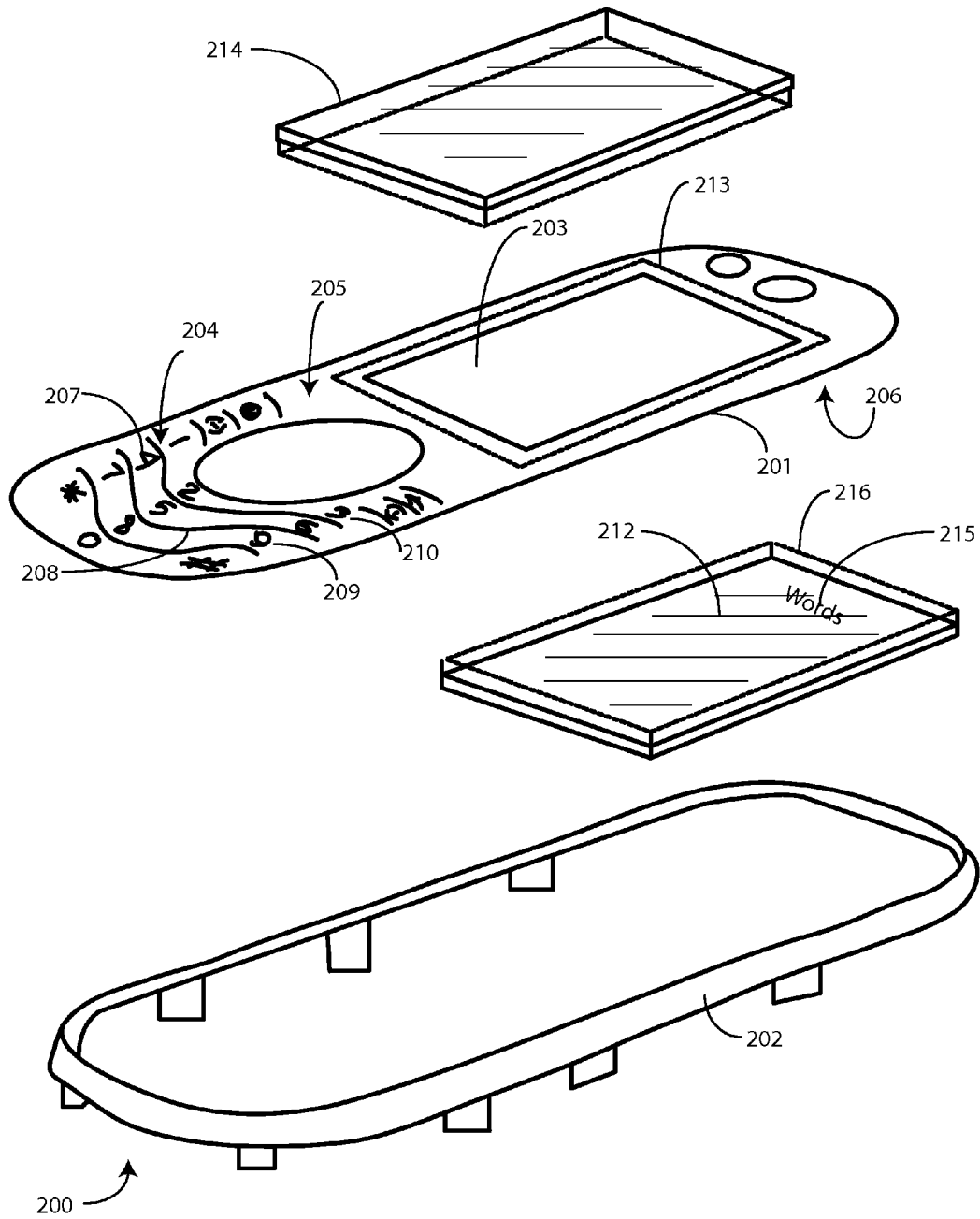
FIG. 2 illustrates an exploded view of one embodiment of a fascia in accordance with the invention.

Turning now to FIG. 2, illustrated therein is an exploded view of a reinforced unitary fascia member 200 for an electronic device in accordance with one embodiment of the invention. The fascia member 200 is suitable for use as a user interface, a housing component, or a housing for the electronic device. A "fascia" is a covering or housing, which may or may not be detachable, for an electronic device like a mobile telephone. While the drawings herein employ a mobile telephone as an exemplary electronic device for discussion, it will be clear to those of ordinary skill in the art having the benefit of this disclosure that the invention is not so limited. The fascia of the present invention could be used for any electronic device having a display, a keyboard, or combinations thereof.

The fascia member 200 includes a thin, flexible membrane 201. In one embodiment, the thin, flexible membrane 201 is a translucent, plastic film, such as 0.2-0.5 millimeter clear film. Suitable films include polycarbonate or other flexible films, such as TF plastic film manufactured by 3M Corporation. The thin, flexible membrane 201 serves as a continuous fascia for an electronic device, and offers a fascia having a thickness of less than 2 millimeters overall. The thin, flexible membrane 201 includes both a transparency region 203 that serves as a display interface, and a deflectable key region 204 that functions as a plurality of deflectable keys 209,210.

To provide additional rigidity to the display interface, in one embodiment a reinforcing member 212 is affixed to the thin, flexible membrane 201, and covers a sub-portion 213 of the thin, flexible membrane 201. In the exemplary embodiment of FIG. 2, the sub-portion 213 is a portion of the thin, flexible membrane 201 that is less than the whole, and covers at least the transparency region 203 of the fascia member 200. The reinforcing member 212, in addition to providing rigidity, offers protection to the display device once the fascia member is integrated into an electronic device.

In one embodiment, the reinforcing member 212 is a rigid, transparent material that is affixed to the thin, flexible membrane by lamination, adhesives, or other suitable methods. The reinforcing member may be manufactured from glass or plastic. Typical applications are suited to glass or plastic that is between 0.1 and 1 millimeters thick, although other diameters may be used. Suitable plastics include polycarbonate and poly-methylmethacrylate. To better protect the reinforcing member, a coating may be applied to the glass or plastic to create a coated plastic or coated glass. Suitable coatings include scratch retarding or ultra-violet light inhibiting coatings. Additionally, strengthening coatings may also be applied. While glass and plastic are two suitable materials, and the aforementioned coatings are suitable for use with these materials, it will be clear to those of ordinary skill in the art having the benefit of this disclosure that the invention is not so limited. Other rigid materials and coatings may also be employed without departing from the spirit and scope of the present invention.

In one embodiment, the reinforcing member 212 is affixed to the rear face 206 of the thin, flexible membrane 201. In so doing, for example where the reinforcing member 212 is glass, the thin, flexible membrane 201 provides protection for the reinforcing member 212 in addition to any coatings that may be applied.

In one embodiment, a second rigid, transparent material 214 may be affixed to the front face 205. As with the reinforcing member 212, the second rigid, transparent material 214 may be disposed on the thin, flexible membrane 201 such that it spans the transparency region 203. This second rigid, transparent material 214 may be used for aesthetic purposes, such as adding a decorative, raised appearance to the display of the device. The second rigid, transparent material 214 may also have a protective function, as it serves to protect the thin, flexible membrane 201 from scratches and other wear.

As with the reinforcing member 212, the second rigid, transparent material 214 may be manufactured from either glass or plastic. The glass or plastic may be coated with light filtering or reflective coatings, or with protective coatings. Additionally, where the second rigid, transparent material 214 is employed, it may be affixed to the thin, flexible membrane 201 by laminating, adhesive, or other suitable means.

Where adhesive is used to affix either the reinforcing member 212 or the second rigid, transparent material 214 to the thin, flexible membrane 201, the adhesive may be modified to provide additional functionality. For instance, the layer of adhesive, which is generally applied by a printing process, may include an ultra-violet reflecting agent so as to be translucent while blocking ultra-violet radiation. Once the adhesive layer 216 has been applied, which may be done through a silk-screen printing process, either the reinforcing member 212 or the second rigid, transparent material 214 may then be affixed to the thin, flexible membrane 201. Experimental results have shown that, depending upon the particular adhesive used, mechanical pressure, heat, vacuum environments, or combinations thereof assist in the curing process.

In one embodiment, the thin, flexible membrane 201 is coupled to a skeletal support member 202. The skeletal support member 202, which may be manufactured from a rigid, durable plastic resin such as polycarbonate, can provide connection features for coupling the fascia member 200 to an electronic device housing. In the alternative, the fascia member 200 may be simply coupled to the electronic device housing by way of an adhesive or thermal welding process.

In one embodiment, the skeletal support member 202 is includes plastic only about the perimeter of the thin, flexible membrane 201. In such an embodiment, the thin, flexible membrane 201 is suspended across the skeletal support member 202 like a drumhead. In this embodiment, there is no plastic behind either the transparency region or the deflectable key region.

Where a skeletal support member 202 is employed, there is no plastic behind the deflectable key region 204 of the thin, flexible membrane 201. This absence of plastic allows depressible key sections, e.g. 209,210, to deflect, thereby serving as keys for the electronic device as will be described below.

Note that in one embodiment above, a translucent plastic film is used as the thin, flexible membrane 201. To provide ornamentation, text, graphics, and other visual indicators, the thin, flexible membrane 201, in one embodiment, includes printing disposed on the rear face 206. By printing on the rear face 206 of the thin, flexible membrane 201, the front face 205 remains smooth and glossy. Additionally, the printing, being disposed on the inside of the device, is protected from wear and abrasion. It will be clear to those of ordinary skill in the art having the benefit of this disclosure that the printing could equally be done on the front face 205. There may even be advantages in doing so, including offering unique textural effects on the exterior of the electronic device. Another advantage is that fine laser printing on the front face 205 may reduce the appearance of fingerprints on the finished device.

When printing on either face of the thin, flexible membrane 201, there is generally no printing in the transparency region 203. Where there is printing, it is generally disposed about the perimeter of the transparency region 203. The lack of printing allows the transparency region 203 to remain translucent, thereby providing a visual window to the electronic device display positioned beneath the transparency region 203. However, either the reinforcing member 212 or the second, transparent material 214 may accommodate printing, e.g. printing 215 on either the front face or the rear face. Such printing, for instance, may include a manufacturer's name or a device model number.

In the printing process, various alphanumeric indicia 207 may be included. For example, where the fascia member 200 is to be used for a mobile telephone, the alphanumeric indicia 207 may include numbers and letters for a plurality of depressible keys 209,210. In such an embodiment, the alphanumeric indicia 207 may comprise graphics corresponding to a telephone keypad.

To provide additional flexibility to the deflectable key region 204, the thin, flexible membrane 201 may include at least one deflectable key region aperture 208 passing between a first depressible key 209 and a second depressible key 210. The deflectable key region aperture 208 allows, for example, first depressible key 209 to be actuated without disturbing second depressible key 210.

Figure 3:
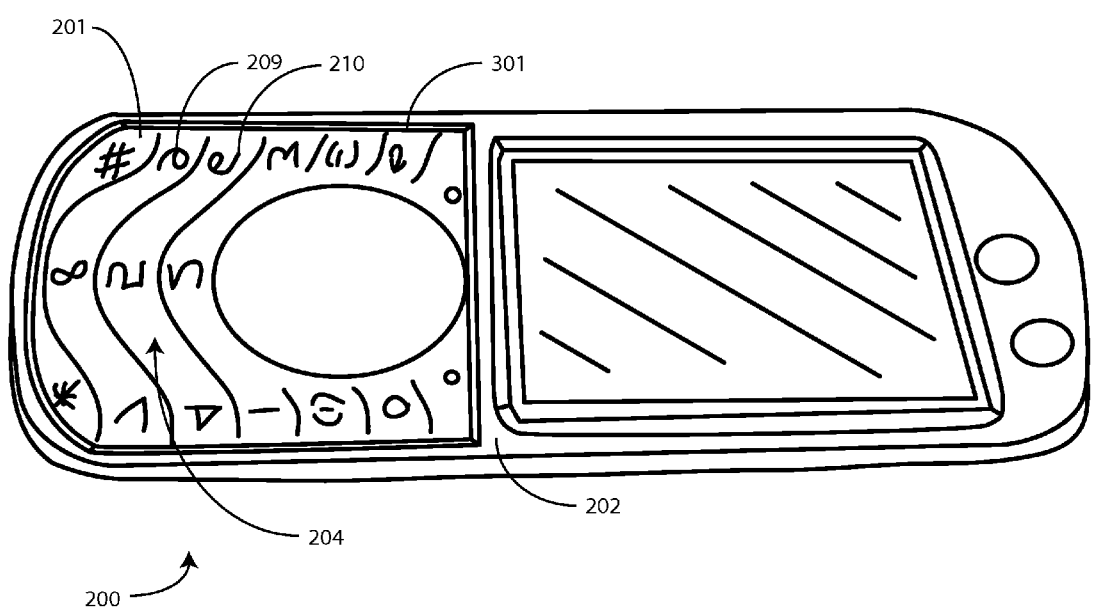
FIG. 3 illustrates a rear perspective view of one embodiment of a fascia in accordance with the invention.

Turning now to FIG. 3, illustrated therein is a rear, perspective view of an assembled, unitary fascia member 200 in accordance with one embodiment of the invention. From this view, the rear face 206, as well as the various components of the optional skeletal support member 202 (where employed—in the vie of FIG. 3, the skeletal support is in place) may be more clearly seen.

The skeletal support member 202 is disposed along the rear face 206 of the thin, flexible membrane 201 in the embodiment of FIG. 3. So that the deflectable key region 204 continues to be deflectable, the skeletal support member 202 is disposed about a perimeter 301 of the deflectable key region 204. Thus, as noted above, no material from the skeletal support member 202 passes beneath the deflectable keys 209, 210.

Figure 4:
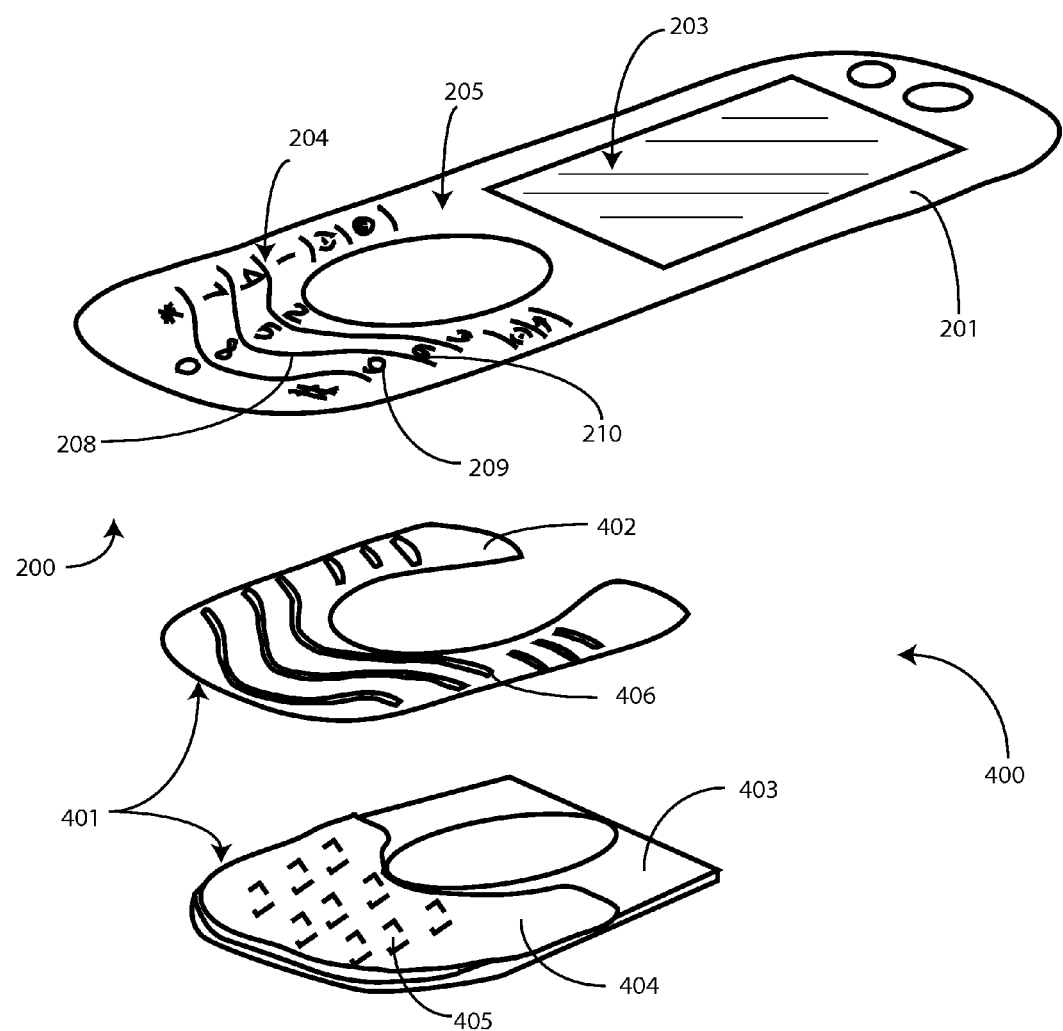
FIG. 4 illustrates an exploded view of a one embodiment of a housing assembly including a fascia in accordance with the invention.

Turning now to FIG. 4, illustrated therein is an exploded view of a fascia assembly 400 in accordance with one embodiment of the invention. The fascia assembly 400 includes a fascia member 200 with a keypad module 401 coupled thereto. The keypad module 401 may be coupled to the fascia member 200 prior to assembly of the electronic device, for example by using an adhesive between the fascia member 200 and the keypad module 401. Alternatively, the keypad module 401 may be coupled to the inner components of the electronic device, and then coupled to the fascia member 200 when the fascia member 200 is coupled to the overall electronic device.

The fascia member 200 may optionally be coupled to a skeletal support member. In the alternative, the fascia member 200 may be simply affixed to the front outer face of an electronic device. As was shown in FIGS. 2 and 3, in one embodiment, the fascia member 200 includes at least a transparency region 203 and a deflectable key region 204 so that the fascia member 200 can serve as a unitary housing component with no break lines between display and keypad.

The keypad module 401, which may be adhered to the fascia member 200 by an adhesive, includes a printed circuit board 403 and a semi-rigid polymer layer 404. The printed circuit board 403 includes a plurality of switches 405 that serve as an electromechanical interface between the depressible keys 209,210 and the electronic circuitry disposed on the printed circuit board 403. The semi-rigid polymer layer 404, which may be a silicone gel layer, provides both mechanical support to the deflectable key region 204 and a gentle tactile feel to the user when actuating the depressible keys 209,210.

A pliable guidance layer 402 may be included between the printed circuit board 403 and the fascia member 200. Where the semi-rigid polymer layer 404 is employed, the pliable guidance layer 402 may be disposed between the fascia member 200 and the semi-rigid polymer layer. The pliable guidance layer 402, which may be manufactured from a spongy rubber material like silicone, can include tactile ribs 406. The tactile ribs 406, in one embodiment, align with the deflectable key region apertures 208 such that the tactile ribs 406 protrude through the deflectable key region apertures 208. The result is a guiding, tactile, outline indicator of each depressible key 209,210 on the front surface of the electronic device. Such a protruding tactile rib 406 is shown in the fascia assembly 400 of FIG. 5.

Figure 5:
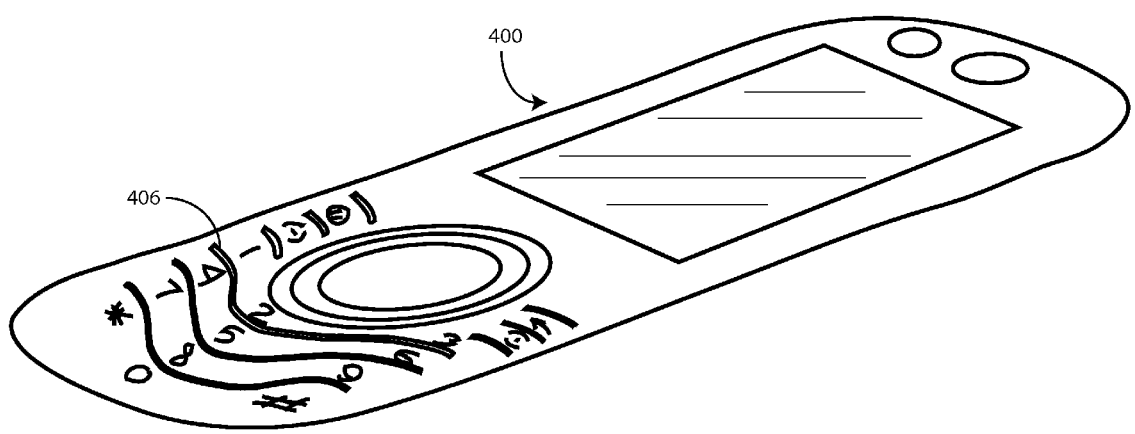
FIG. 5 illustrates a perspective view of one embodiment of a housing in accordance with the invention.
Figure 6:
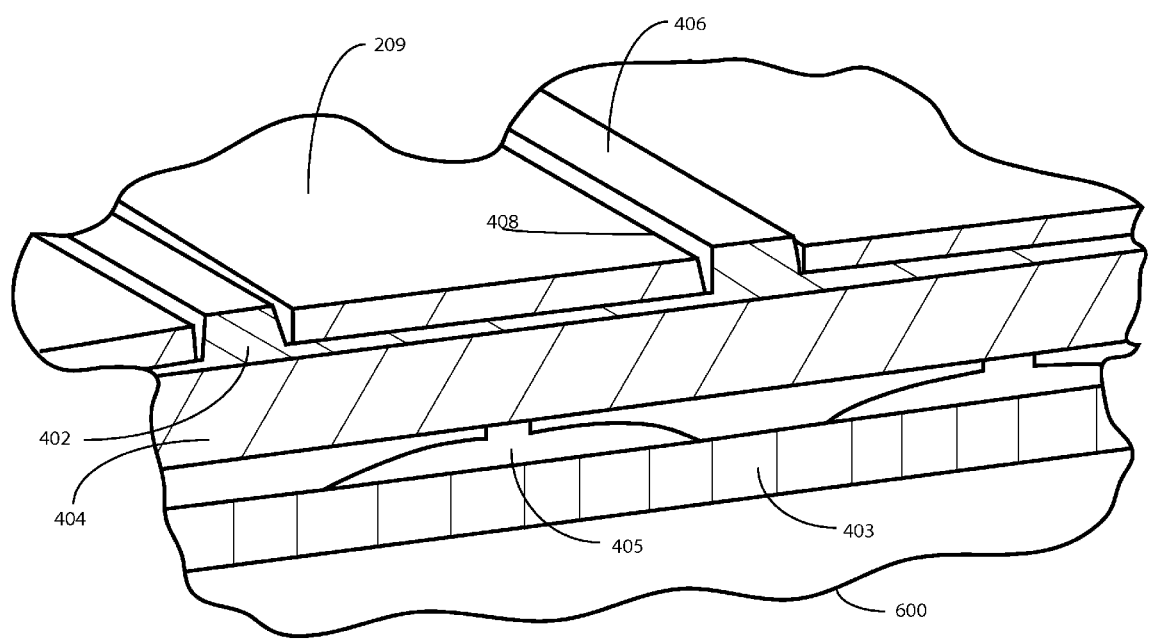
FIG. 6 illustrates a magnified view of one embodiment of a housing in accordance with the invention.

Turning now to FIG. 6, illustrated therein is a cross sectional view of the completed, unitary fascia assembly 400 of FIGS. 4 and 5. The enlarged cross section 600 shows the layering of the printed circuit board 403, the semi-rigid polymer layer 404, and the pliable guidance layer 402.

Switches 405 are disposed on the printed circuit board. Atop the switches 405 sits the semi-rigid polymer layer 404. Where the switches 405 are illuminated, a clear, semi-rigid polymer layer 404 may be used as a light pipe or light guide between the switch 405 and the depressible key 209.

The pliable guidance layer 402 sits atop the semi-rigid polymer layer 404, such that the tactile rib 406 passes through the deflectable key region aperture 408. Thus, the tactile rib 406 offers a user a convenient, touch perceptible way to guide his fingers to the depressible keys 209. The various layers may be coupled together by way of a glue or double-sided adhesive film.

Figure 7:
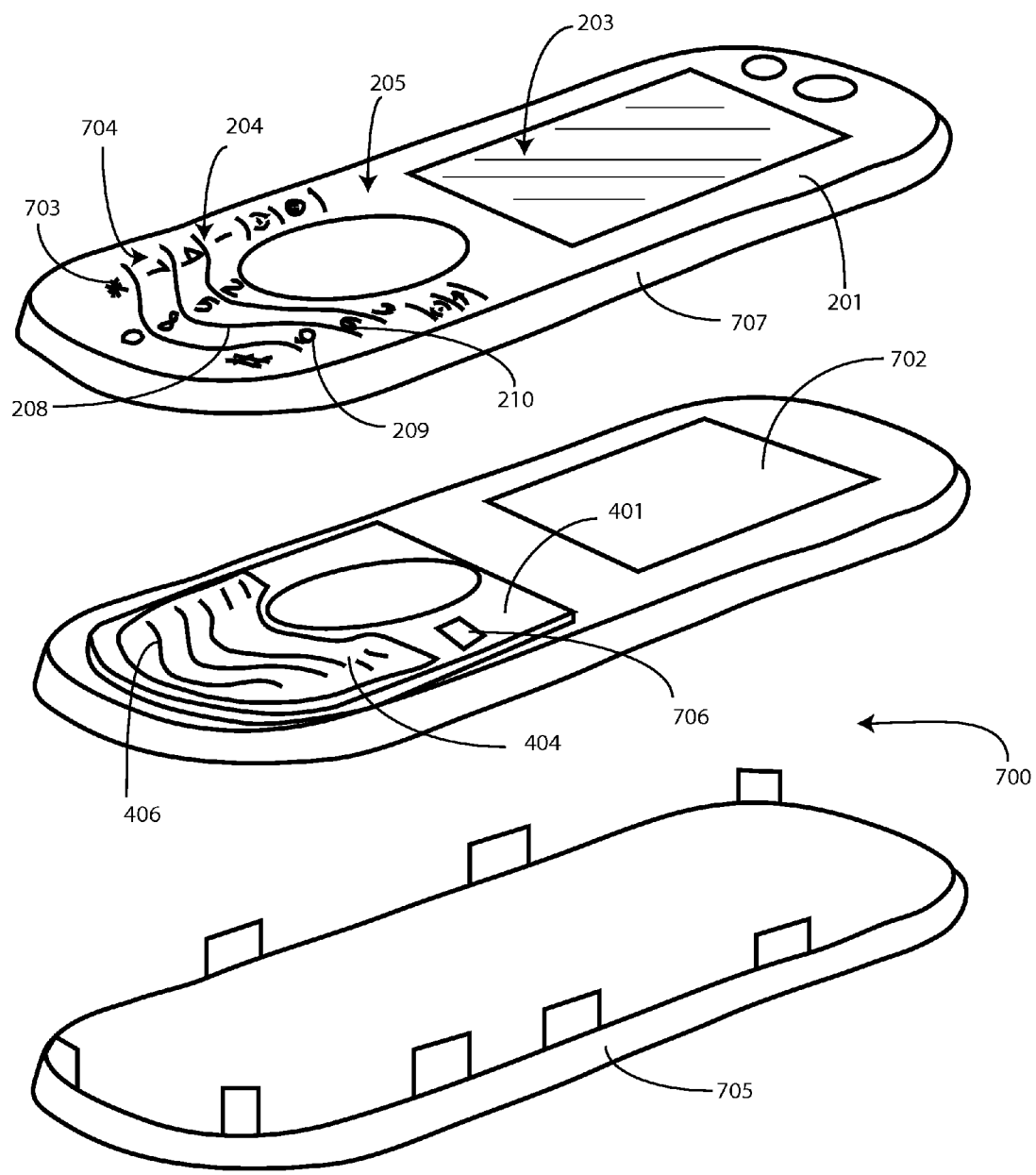
FIG. 7 illustrates an exploded view of one embodiment of an electronic device having a housing with a fascia in accordance with the invention.

Turning now to FIG. 7, illustrated therein is an exploded view of a wireless telecommunication device 700 using a fascia assembly 701 in accordance with one embodiment of the invention. The front face 205 of the fascia assembly 701 serves as the major front face for the wireless telecommunication device 700.

As with previous embodiments, the fascia assembly 701 includes a thin, flexible membrane 201 spanning substantially the major front face of the wireless telecommunication device 700. The thin, flexible membrane 201 includes a transparency region 203 and a deflectable key region 204. The deflectable key region 204 serves as a plurality of depressible keys 209, 210. There are no external break lines between the transparency region 203 and the deflectable key region 204. In the embodiment of FIG. 7, the fascia assembly 701 has simply been affixed to a housing member 707 of the wireless telecommunication device 700 with an adhesive layer.

Electronic circuitry 706, which may include a transceiver, processor, memory, clock and driver circuits, power management circuitry and other functional circuitry, is disposed within the wireless telecommunication device 700. The electronic circuitry 706 includes a display module 702. The display module, which may be a liquid crystal or similar type of display, is disposed within the wireless telecommunication device 700 so as to be viewable through the transparency region 203 of the fascia assembly 701.

A keypad module 401, such as the one shown in FIG. 4 having a plurality of switches, is also included. The keypad module 401 is disposed within the wireless telecommunication device 700 so as to be actuatable upon any of the plurality of keys 209,210 being pressed by a user.

In the exemplary embodiment of FIG. 7, the wireless telecommunication device 700 is illustrated as a mobile radiotelephone. It will be clear to those of ordinary skill in the art having the benefit of this disclosure, however, that the invention is not so limited. Other electronic devices, including portable music players, portable computers, electronic messaging devices, pagers, gaming devices, and two-way radios may also employ the fascia assembly 701 of the present invention.

In the exemplary embodiment of FIG. 7, the plurality of depressible keys 209,210 serve as the mobile radiotelephone keypad interface 704. The user simply presses any of the keys 209,210 to operate the device. As noted in FIG. 2, the thin, flexible membrane 201 may include graphical printing 703, such as the numbers 0, 1, 2, 3, 4, 5, 6, 7, 8, and 9, and the letters abc, def, ghi, jkl, mno, pqrs, tuv, and wxyz. Additionally, where the pliable guidance layer 402 is used, the tactile ribs 406 may protrude through the deflectable key region apertures 208 to provide key guidance to the user. The wireless telecommunication device 700 is assembled by coupling the fascia assembly 701 to a bottom housing member 705 about the electronic circuitry 706.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A reinforced unitary fascia member for an electronic device comprising a thin, flexible membrane comprising a front face and a rear face and having at least a transparency region and a deflectable key region and a reinforcing member, the deflectable key region functioning as a surface for a plurality of depressible keys, wherein the reinforcing member comprises a rigid, transparent material that is coupled to a sub-portion of the thin, flexible membrane and disposed along the rear face.

2. The unitary fascia member of claim 1, wherein the rigid, transparent material comprises one of glass, plastic, or coated plastic.

3. The unitary fascia member of claim 2, wherein the rigid, transparent material comprises coated plastic manufactured from one of coated polycarbonate or coated poly-methylmethacrylate resin.

4. The unitary fascia member of claim 1, wherein the rigid, transparent material is disposed over at least the transparency region.

5. The unitary fascia member of claim 1, wherein the rigid, transparent material comprises one of glass, plastic, or coated plastic spanning the transparency region along a rear face of the thin, flexible membrane.

6. The unitary fascia member of claim 5, further comprising a second rigid, transparent material spanning the transparency region along a front face of the thin, flexible membrane.

7. The unitary fascia member of claim 6, wherein the second rigid, transparent material is one of glass, plastic, or coated plastic.

8. The unitary fascia member of claim 1, wherein the reinforcing member is affixed to the thin, flexible membrane by a layer of adhesive.

9. The unitary fascia member of claim 8, wherein the layer of adhesive comprises ultra-violet reflective adhesive.

10. The unitary fascia member of claim 1, wherein the thin, flexible membrane comprises printing disposed thereupon, the printing comprising alphanumeric indicia for the plurality of depressible keys.

11. The unitary fascia member of claim 10, wherein the alphanumeric indicia comprise telephone keypad graphics.

12. The unitary fascia member of claim 1, wherein the thin, flexible membrane comprises a plastic film having a thickness of between 0.1 and 1 millimeters.

13. The unitary fascia member of claim 1, further comprising an electronic device housing member, wherein the thin, flexible membrane is affixed to the electronic device housing member by one of press-fit attachment, snaps, pressure sensitive adhesive, liquid adhesive, or ultrasonic welding.

14. The unitary fascia member of claim 1, wherein the thin, flexible membrane comprises at least one deflectable key region aperture passing between a first depressible key and a second depressible key.

15. A fascia assembly for a portable electronic device, the fascia assembly comprising:
    a fascia, comprising:
        a thin, flexible film having at least a transparency region and a deflectable key region, the deflectable key region functioning as a plurality of depressible keys; and
        a transparent, reinforcing member affixed to a subregion of the thin, flexible film, the subregion covering at least the transparency region; and
    a keypad module adhered to the fascia, the keypad module comprising:
        a printed circuit board having a plurality of switches disposed thereon; and
        a semi-rigid polymer layer disposed between the fascia and the printed circuit board.

16. The fascia assembly of claim 15, wherein the unitary fascia member comprises at least one deflectable key region aperture passing between a first depressible key and a second depressible key, further comprising a pliable guidance layer comprising at least one tactile rib, the pliable guidance layer being disposed between the semi-rigid polymer layer and the unitary fascia member such that the at least one tactile rib protrudes through the at least one deflectable key region aperture.

17. A wireless telecommunication device having a major front face, the wireless telecommunication device comprising:
    a fascia assembly comprising a thin, flexible membrane spanning substantially the major front face, the thin, flexible membrane having at least a transparency region and a deflectable key region, the deflectable key region functioning as a plurality of depressible keys, and a transparent, reinforcing member affixed to the thin, flexible membrane, the transparent, reinforcing member covering the transparency region without covering the deflectable key region;

a display module disposed within the wireless telecommunication device so as to be viewable through the transparency region of the fascia assembly; and a keypad module comprising a plurality of switches disposed within the wireless telecommunication device so as to be actuatable upon any of the plurality of depressible keys being pressed.

18. The wireless telecommunication device of claim 17, wherein the wireless telecommunication device comprises a mobile radiotelephone, further wherein the plurality of depressible keys comprise a mobile radiotelephone keypad interface.

* * * * *